United States Patent
Jones et al.

(10) Patent No.: US 10,806,147 B2
(45) Date of Patent: Oct. 20, 2020

(54) TREATMENT METHOD FOR A HYDROCARBON-CONTAINING SYSTEM USING A BIOCIDE

(75) Inventors: Chris Jones, Cheslyn Hay (GB); Stephanie Edmunds, Willenhall (GB); Gareth Collins, Wordsley Stourbridge (GB)

(73) Assignee: RHODIA OPERATIONS, Aubervilliers (FR)

( * ) Notice: Subject to any disclaimer, the term of this patent is extended or adjusted under 35 U.S.C. 154(b) by 0 days.

(21) Appl. No.: 14/003,377

(22) PCT Filed: Feb. 29, 2012

(86) PCT No.: PCT/GB2012/050456
§ 371 (c)(1),
(2), (4) Date: Nov. 7, 2013

(87) PCT Pub. No.: WO2012/120278
PCT Pub. Date: Sep. 13, 2012

(65) Prior Publication Data
US 2014/0080792 A1    Mar. 20, 2014

(30) Foreign Application Priority Data
Mar. 7, 2011   (GB) .................................. 1103748.8

(51) Int. Cl.
*C02F 1/50*         (2006.01)
*C09K 8/54*         (2006.01)
(Continued)

(52) U.S. Cl.
CPC ............... *A01N 57/20* (2013.01); *C02F 1/50* (2013.01); *C09K 8/54* (2013.01); *C09K 8/58* (2013.01);
(Continued)

(58) Field of Classification Search
None
See application file for complete search history.

(56) References Cited

U.S. PATENT DOCUMENTS 3,054,748 A    9/1962   Hodge
4,673,509 A *  6/1987   Davis et al. .................. 210/699
(Continued)

FOREIGN PATENT DOCUMENTS

GB    2379440 B    10/2003
GB    2432154 A    5/2007
(Continued)

OTHER PUBLICATIONS

Eden, R.D., et al—"Oilfield Reservoir Souring" OTH 92 385, 1993, Health and Safety Executive, Offshore Technology Report; ISBN 0-7176-0637-6; pp. 1-90; 99 pgs.
(Continued)

*Primary Examiner* — Savitha M Rao
*Assistant Examiner* — Andrew P Lee

(57) ABSTRACT

A method for reducing the effects of biological contamination in a hydrocarbon-containing system comprising the steps of continuously adding a formulation comprising tris (hydroxymethyl)phosphine or a tetrakis(hydroxymethyl) phosphonium salt to the system for one day or more; monitoring the efficacy of the continuous treatment by an assessment of the extent to which there is any effect on the environment that is attributable to metabolic activity of active microbes present in the system; wherein the tris (hydroxymethyl)phosphine or tetrakis(hydroxymethyl) phosphonium salt is added at a concentration of from 1 to 30 ppm based on the total volume of aqueous fluid added to the system, and wherein the formulation is added to the system at a stage to minimize incompatibility with any other chemicals that are added to the aqueous fluid. The treatment disrupts the microbial activity of active microbes in the (Continued)

hydrocarbon-containing system and can prevent or reduce detrimental effects arising from the presence of active microbes in the system.

26 Claims, 4 Drawing Sheets

(51) Int. Cl.
  *C09K 8/58*  (2006.01)
  *A01N 57/20*  (2006.01)
  *C09K 8/60*  (2006.01)
  C02F 103/10  (2006.01)
  C02F 5/00  (2006.01)

(52) U.S. Cl.
  CPC ............ *C09K 8/605* (2013.01); *C02F 5/00* (2013.01); *C02F 2103/10* (2013.01); *C09K 2208/20* (2013.01)

(56) References Cited

U.S. PATENT DOCUMENTS

| | | | |
|---|---|---|---|
| 2003/0062316 A1* | 4/2003 | Mattox | B08B 9/032 210/700 |
| 2010/0137170 A1* | 6/2010 | Wolf et al. | 507/236 |
| 2010/0190666 A1* | 7/2010 | Ali | C09K 8/68 507/235 |
| 2010/0298275 A1 | 11/2010 | Yin et al. | |
| 2011/0017677 A1* | 1/2011 | Evans | C02F 1/5236 210/708 |
| 2012/0087993 A1* | 4/2012 | Martin | 424/661 |

FOREIGN PATENT DOCUMENTS

| | | |
|---|---|---|
| WO | WO 9933345 A1 | 7/1999 |
| WO | WO 03016432 A1 | 2/2003 |
| WO | WO 2005014491 A1 | 2/2005 |
| WO | WO 2005040050 A1 | 5/2005 |
| WO | WO 2005074688 A2 * | 8/2005 |
| WO | WO 2007038403 A2 | 4/2007 |
| WO | WO 2007065107 A2 | 6/2007 |
| WO | WO 2009015088 A2 | 1/2009 |
| WO | WO 2009015089 A2 | 1/2009 |
| WO | WO 2009039004 A1 * | 3/2009 |
| WO | WO 2011016909 A1 | 2/2011 |

OTHER PUBLICATIONS

Macleod, N., et al—"A Novel Biocide for Oilfield Applications", 1990, Presented at an SPE Conference, Aberdeen, 18 pgs.

Saji, Viswanathan, S.—"A Review on Recent Patents in Corrosion Inhibitors", 2010, Recent Patents on Corrosion Science, vol. 2, pp. 6-12, Bentham Open (Licensee), Open Access; 7 pgs.

* cited by examiner

TREATMENT METHOD FOR A HYDROCARBON-CONTAINING SYSTEM USING A BIOCIDE

CROSS-REFERENCE TO RELATED APPLICATIONS

This application is a U.S. national stage entry under 35 U.S.C. § 371 of International Application No. PCT/GB2012/050456 filed Feb. 29, 2012, which claims priority to UK Application No. 1103748.8 filed on Mar. 7, 2011, the whole content of this application being herein incorporated by reference for all purposes.

TECHNICAL FIELD OF THE INVENTION

The present invention relates to the treatment of hydrocarbon-containing systems, such as oil and gas reservoirs, using a method that disrupts microbial activity, e.g. it may disrupt bacterial activity. The method therefore prevents or reduces the detrimental effects from the presence of active microbes, such as bacteria.

BACKGROUND OF THE INVENTION

Biological contamination is a costly and undesirable phenomenon that can occur in hydrocarbon-containing systems such as oil and gas reservoirs.

To increase the yield from hydrocarbon-containing reservoirs, water is pumped under pressure into the reservoir, to shepherd the crude hydrocarbon towards the production wells and to maintain reservoir pressure. This water is therefore injected into the reservoir, passes through the reservoir and then leaves the reservoir (as "produced water"). The water used is commonly seawater. Further, the water will be de-aerated in order to avoid corrosion. The injection of cold de-aerated seawater can provide a number of key elements for biological contamination. For example, the cooling effect of the seawater reduces the temperature around the injector to within the thermal viability limits of prokaryotes. The pH of the seawater is also within the required range for microbial activity. Therefore biological contamination of such reservoirs can easily become a problem.

Biological contamination can result in various detrimental effects from the presence of active microbes, such as bacteria, in the hydrocarbon-containing reservoirs. These detrimental effects include biofouling, corrosion, and biological souring.

The activity of sulfate-reducing prokaryotes (SRP) within hydrocarbon-containing reservoirs is known to cause significant problems for the industry. This is due to metabolic $H_2S$ production leading to problems such as souring and corrosion of pipelines and production facilities.

Biological souring involves sulphate-reducing prokaryotes (SRP) consuming carbon and reducing sulphate to generate hydrogen sulphide. Once established, the microbes can multiply and spread throughout the reservoir resulting in a potentially rapid rise in hydrogen sulphide production.

In addition, other microbes are known to be problematic. In particular, methanogenic archaea have been detected in high numbers (up to $10^8$ cells per gram solids) in oil production facilities. It is believed that methanogenic species are involved in microbially-induced corrosion (MIC), due to them consuming hydrogen and $CO_2$ in the production of methane. Additionally, some strains of methanogenic species (e.g. *Methanosarcinales* species) can produce $H_2S$ in their metabolisms, therefore leading to leading to problems such as souring and corrosion of pipelines and production facilities.

In order for biological souring to occur, three conditions must be met:

1. There have to be sulphate-reducing prokaryotes (SRP) present. These may be sulphate-reducing bacteria (SRB) and/or sulphate-reducing archaea (SRA).
2. The substrates required for microbial proliferation must be present in sufficient amounts. Generally, in order to proliferate, SRP require the availability of metabolisable carbon and sulphate substrates, in addition to the usual elements essential for biomass growth such as phosphate, nitrogen, and trace metals.
3. The environmental conditions, such as pH, temperature, redox potential and pressure, must be within the ranges that permit the SRP to function.

De-aerated seawater provides suitable reducing conditions for the SRP and the high sulphate levels provide the required sulphur source. Therefore biological souring is commonly encountered in hydrocarbon-containing reservoirs, where seawater is pumped under pressure into the reservoir.

Reservoir souring has been defined as a concentration of 3 ppm or greater, by volume, of hydrogen sulphide gas ($H_2S$) in the produced fluid (R D Eden, P J Laycock and M Fielder, 1993, Offshore Technology Report OTH 92 385, Health and Safety Executive). Hydrogen sulphide is highly undesirable in the produced fluids since it is toxic and highly corrosive to production tubulars and processing equipment, and, if hydrogen sulphide is present as a contaminant this adversely affects the sales quality of the oil and gas.

The generation of hydrogen sulphide in hydrocarbon-containing systems can therefore have health and safety implications, may cause corrosion of steel and other materials, and may give rise to costs associated with scavenging the hydrogen sulphide from the hydrocarbon fluids. It is therefore desirable to prevent or reduce the generation of hydrogen sulphide in hydrocarbon-containing systems.

There are three known options for dealing with biological reservoir souring:

1. Preventing or inhibiting the establishment of SRP within a reservoir (known as keeping the reservoir "sweet").
2. Remediating a reservoir that has already soured, through the use of a biocide to destroy the SRP.
3. Dealing with the produced $H_2S$ gas, for example, through dosing with scavenger chemicals.

Generally, biological contamination of systems, such as biofouling, corrosion, and biological souring, will be addressed by adding biocide to the system, in order to destroy the microbes or other bacteria that are causing the detrimental effects. This is the case for sulfate-reducing prokaryotes (SRP), such as sulphate-reducing bacteria (SRB) and/or sulphate-reducing archaea (SRA), and for other problematic microbes, in particular methanogenic species such as methanogenic archaea.

The region of reservoir that is suitable for microbial activity is termed the thermal viability shell (TVS). The injection of fluid that is cool, relative to the ambient reservoir temperature, results in a reduction in temperature and this permits the activity of microbes that would otherwise be incapable of functioning at the ambient reservoir temperature. Thus over the production life of the reservoir the TVS will grow, increasing the volume of reservoir capable of supporting biological activity.

Tetrakis(hydroxymethyl)phosphonium sulphate (THPS) has been used as a biocide in the role of remediation. It is known that THPS has a biocidal effect on various gram positive and gram negative bacteria and its proven effect on archaea confirms THPS can impact a variety of cell structures.

THPS is particularly suited to a biocidal role in hydrocarbon-containing reservoirs as it is not chemically deactivated by the presence of sulphide, unlike alternative biocides such as glutaraldehyde and acrolein. Conventionally, THPS is dosed as high concentration "shots" of biocide on a regular basis; typically once to three times per week for 1 to 6 hours duration at concentrations in the range of 50 to 500 ppm. For example, in N Macleod, T Bryan, A J Buckley, R E Talbot, and M A Veale, 1990, A Novel Biocide For Oilfield Applications, *SPE Aberdeen*, the procedure used was 100 ppm (w/v) active product for three hours once per week.

The conventional wisdom is that this type of dosing procedure is necessary to ensure cell lysis and death of the microbes, with the intention being to rapidly reduce the viable numbers of bacteria or other microbes to close to zero. These numbers will then increase between doses, but the regime can be optimised, based on the concentration and time between doses, to ensure that the number of live bacteria or other problematic microbes does not ever exceed a desired level.

For fractured reservoirs or highly permeable reservoirs, where discrete doses of high THPS concentrations can pass through the reservoir with the water injection flow, this traditional approach can be highly effective if an optimised treatment programme is maintained.

However, for lower permeability reservoirs, where a slower flow pattern is observed, the traditional "shot" dosing approach may not be able to deliver a sufficiently high concentration of biocide to the regions of microbial activity, e.g. biological activity, to be effective in controlling the biological contamination, particularly as the reservoir matures and the TVS expands further into the reservoir matrix.

SUMMARY OF THE INVENTION

The invention provides a method for reducing the effects of biological contamination in a hydrocarbon-containing system into which aqueous fluid is injected, the method comprising the steps of:
continuously adding a formulation comprising tris(hydroxymethyl)phosphine or a tetrakis(hydroxymethyl) phosphonium salt to the system for a time period of one day or more;
monitoring the efficacy of the continuous treatment by an assessment of the extent to which there is any effect on the environment that is attributable to metabolic activity of active microbes present in the system; and
if required, optimising the continuous treatment to ensure that the treatment is having an effect on the metabolic activity of active microbes present in the system;
wherein the tris(hydroxymethyl)phosphine or tetrakis(hydroxymethyl)phosphonium salt is added at a concentration of from 1 to 30 ppm, based on the total volume of aqueous fluid added to the system,
and wherein the formulation is added to the system at a stage to minimise incompatibility with other any other chemicals that are added to the aqueous fluid.

The invention also provides the use of a formulation comprising tris(hydroxymethyl)phosphine or a tetrakis(hydroxymethyl)phosphonium salt to disrupt the microbial activity in a hydrocarbon-containing system into which aqueous fluid is injected, wherein the tris(hydroxymethyl) phosphine or tetrakis(hydroxymethyl)phosphonium salt is continuously added to the system at a concentration of from 1 to 30 ppm, based on the total volume of aqueous fluid added to the system.

The invention also provides the use of a formulation comprising tris(hydroxymethyl)phosphine or a tetrakis(hydroxymethyl)phosphonium salt to prevent or reduce the detrimental effects from the presence of active microbes in a hydrocarbon-containing system into which aqueous fluid is injected, wherein the tris(hydroxymethyl)phosphine or tetrakis(hydroxymethyl)phosphonium salt is continuously added to the system at a concentration of from 1 to 30 ppm, based on the total volume of aqueous fluid added to the system. The detrimental effects are preferably selected from: the generation of hydrogen sulphide (especially the generation of hydrogen sulphide by sulphate-reducing prokaryotes), the generation of methane (especially the consumption of hydrogen and $CO_2$ in the generation of methane), and microbially-induced corrosion (especially microbially-induced corrosion of metal surfaces). It may be that the detrimental effects are selected from: the generation of hydrogen sulphide by sulphate-reducing prokaryotes, and microbially-induced corrosion of metal surfaces.

In the present invention the active microbes may be active bacteria (e.g. sulphate-reducing bacteria), or other active microbes, such as archaea, (e.g. methanogenic archaea or sulphate-reducing archaea). Thus the microbial activity may be due to active bacteria or to other active microbes, such as archaea.

The invention may be used in relation to any bacteria (or other microbes) that can be found in petroleum reservoirs, including sulphate-reducing prokaryotes (SRP) (which may be sulphate-reducing bacteria and/or sulphate-reducing archaea), general heterotrophic bacteria (GHB), and nitrate-reducing bacteria (NRB).

The invention is based on identifying that the continuous addition of low levels of tris(hydroxymethyl)phosphine (THP) or a tetrakis(hydroxymethyl)phosphonium salt (THPX) has a beneficial effect in respect of the microbial contamination of hydrocarbon-containing systems, namely that it disrupts the microbial activity and therefore prevents or reduces the detrimental effects from the presence of active microbes. In one embodiment, it has been identified that the continuous addition of low levels of tris(hydroxymethyl) phosphine (THP) or a tetrakis(hydroxymethyl)phosphonium salt (THPX) has a beneficial effect in respect of the bacterial contamination of hydrocarbon-containing systems, namely that it disrupts the bacterial activity and therefore prevents or reduces the detrimental effects from the presence of active bacteria.

It has surprisingly been found that this "biostatic" effect only occurs with any effectiveness when continuous dosing in the range of from 1 to 30 ppm is employed. Thus there are dosage regimes for THP/THPX where there is no effective action on bacteria or other microbes, because the known biocidal effect of THP/THPX only occurs at concentrations of 50 ppm and above.

In a known treatment regime using THP/THPX, reducing the concentration of the dosage reduces the effectiveness of the treatment. It was not expected that the use of continuous dosing with concentrations significantly below the level where a biocidal effect stops would be a useful treatment regime.

Thus the present invention goes against the mindset that high doses of biocide need to be used and that these need to be added in short discrete intervals. In particular, the present invention has identified that a beneficial effect can be achieved by not killing the bacteria or other microbes but instead by following a new mechanism of action, which involves continuously disrupting the activity of the bacteria or other microbes, and monitoring and optimising the treatment regime based on this "biostatic" effect. The prior techniques did not provide the skilled person with a technically viable alternative to the "shot" or "batch" dosage type of regimes.

For most biocides a continuous dosing of low concentrations of biocide would not be effective. Many biocides would not be effective against the bacteria or other microbes at the low concentrations being used in the present invention. The levels used are below the concentrations required to have a significant lethal effect on bacteria or other microbes. Equally, many biocides would not be stable in the reservoir environment for prolonged periods of time and hence continuous use would not be an effective option.

It has been identified that the THP and THPX salts that are used as active agents in the present invention, such as THPS, are stable in the hydrocarbon reservoir environment (and therefore can be used continuously) and act to control metabolic activity of bacteria, such as SRB, or other microbes when dosed at specific low concentrations, for example by inhibiting lactate dehydrogenase production and disrupting the energy metabolism. Therefore negative effects of bacterial contamination, such as $H_2S$ production, reservoir souring and corrosion, can be inhibited by the use of these agents at low concentrations without actually destroying the bacteria. Equally, negative effects of other microbes, such as methanogenic archaea (which produce methane, and can cause corrosion) and sulphate-reducing archaea (which produce $H_2S$, and can cause souring and corrosion), can be inhibited by the use of these agents at low concentrations without actually destroying the microbes.

In particular, the continuous low concentrations of the THP or THPX used in the invention have been found to inhibit sulphide reduction, to inhibit the bacterial energy cycle/uncoupling, and to inhibit lactate dehydrogenase production.

It is believed that in the presence of the continuous low concentrations of the THP or THPX the bacteria or other microbes remain alive, but with reduced energy efficiency, resulting in reduced growth. Therefore the negative effects of microbes (such as SRP and methanogenic archaea) that arise due to metabolic activity of the microbes are reduced or prevented by this treatment.

The invention is particularly beneficial because this method permits the treatment of all types of hydrocarbon-containing systems. In particular, it may be used to treat a low permeability reservoir or a mature reservoir with a large TVS, which would be problematic for conventional techniques. Essentially, because low levels of the active agent are used continuously, an equilibrium is formed within the reservoir and therefore all areas of the reservoir receive the treatment and its beneficial effects, rather than only the regions close to the input of the "shot" dose. The invention also provides a particularly effective approach for reservoirs that are already highly soured, as it does not need very high levels of biocide to kill all of the bacteria or other microbes present in such a system.

It will, however, be appreciated that the approach can also be used for fractured reservoirs, or highly permeable reservoirs, or reservoirs that are new or relatively "sweet".

Additional benefits of the invention are that the system may be treated at a lower cost and in a simpler procedure that does not require accurate timing of "shots" of treatment.

It is also believed that biofilm can act as a diffusion barrier to "shot" dosed biocide, reducing both the contact time and concentration of the biocide or other microbes with the bacteria and limiting the biocidal action to the cells occupying the outer portions of the biofilm. In the continuously dosed regime of the present invention, there is no concentration gradient and therefore all bacteria or other microbes become exposed to the biocide. Therefore the approach is also beneficial for systems having biofilm present, or which are prone to biofilm formation.

BRIEF DESCRIPTION OF THE DRAWINGS

For a detailed description of various embodiments of the invention, reference will now be made to the accompanying drawings, in which.

DETAILED DESCRIPTION OF THE INVENTION

Figure 1:
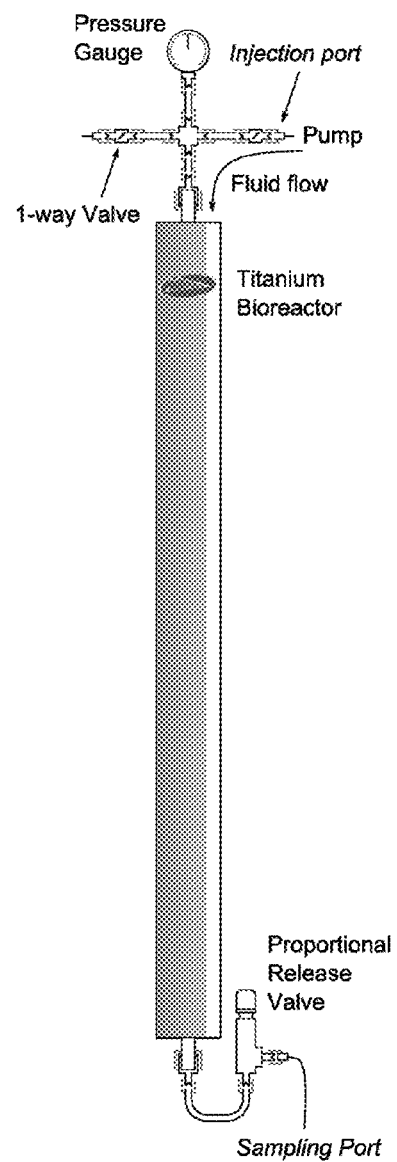
FIG. 1 is a schematic diagram of the bioreactor in accordance with one embodiment of the present invention.

The formulation used in the present invention includes as an active agent tris(hydroxymethyl)phosphine (THP) or a tetrakis(hydroxymethyl)phosphonium salt (THPX). Preferably, a salt of formula THPX, wherein X is chloride, sulphate, bromide, iodide, phosphate, acetate, oxalate, citrate, borate, chlorate, lactate, nitrate, fluoride, carbonate or formate is used. Most preferably, tetrakis(hydroxymethyl) phosphonium sulphate (THPS), tetrakis(hydroxymethyl) phosphonium chloride (THPC) or tetrakis(hydroxymethyl) phosphonium phosphate (THPP) is used. In one preferred embodiment THPC or THPS is used, for example THPS.

The formulation is added to the system for a time period of 1 day or more, such as 2 days or more, 3 days or more, 4 days or more, 5 days or more or 6 days or more. Preferably the active agent is added to the system for 7 days or more, such as 10 days or more, 14 days or more, 21 days or more or 28 days or more. In one embodiment, the active agent is added to the system for a time period of 30 days or more, such as 40 days or more, 50 days or more, 75 days or more or 100 days or more.

The THP or THPX active agent is added at a concentration of from 1 to 30 ppm, based on the total volume of aqueous fluid added to the system; preferably from 1 to 25 ppm, such as from 2 to 24 ppm or from 3 to 23 ppm or from 4 to 22 ppm or from 5 to 21 ppm. Preferably the THP or THPX active agent is added at a concentration of from 5 to 25 ppm based on the total volume of aqueous fluid added to the system, more preferably from 7.5 ppm to 22.5 ppm. In one embodiment, the THP or THPX active agent is added at a concentration of from 6 to 24 ppm, such as from 7 to 23 ppm or from 8 to 22 ppm or from 9 to 21 ppm, based on the total volume of aqueous fluid added to the system.

In one preferred embodiment the THP or THPX active agent is added at a concentration of from 10 to 20 ppm, based on the total volume of aqueous fluid added to the system, e.g. from 10 to 15 ppm or from 15 to 20 ppm.

In the present invention the formulation is added to the system at a stage to minimise incompatibility with other any other chemicals that are added to the aqueous fluid.

It is preferred that the formulation comprising the THP or THPX is added to the aqueous fluid before the aqueous fluid is injected into the hydrocarbon-containing system, and thus the formulation and the aqueous fluid are injected simultaneously. However, in an alternative embodiment the formulation could be injected into the hydrocarbon-containing system separately from the aqueous fluid.

Conventional "shot" biocidal treatments of hydrocarbon-containing systems will involve the addition of the biocide to the aqueous fluid at around the same time it is de-aerated, e.g. by adding an oxygen scavenger. This will commonly be about two minutes prior to the aqueous fluid being injected into the hydrocarbon-containing system, as part of the pre-treatment of the aqueous fluid. As the biocide is added in high concentrations for short periods of time, any chemical interaction between the biocide and the scavenger, or any other chemical added in the pre-treatment, is restricted and any negative interactions do not have a significant impact on the efficacy of the "shot" biocidal treatment.

In the present invention, where there is continuous addition of low doses of the active agent, it is important that the formulation is added separately from any other chemicals with which it is incompatible. Otherwise any negative effects of the interaction could have a significant impact on the efficacy of the low dosage treatment.

Accordingly, the formulation is added to the system at a stage to minimise incompatibility with other any other chemicals that are added to the aqueous fluid. Of course, if any chemicals are added to the system that do not have incompatibility with the THP or THPX then these could be added together with the THP or THPX, should this be desired.

It is preferred that the formulation comprising the THP or THPX is added to the aqueous fluid after the pre-treatment of the aqueous fluid. The pre-treatment may involve de-aeration and/or other pre-treatments to make the aqueous fluid suitable for injection into the system. Preferably, the formulation comprising the THP or THPX is added to the aqueous fluid 30 seconds or less before the aqueous fluid is injected into the hydrocarbon-containing system.

It is particularly preferred that the formulation is added to the aqueous fluid 25 seconds or less before the aqueous fluid is injected into the hydrocarbon-containing system, such as 20 seconds or less, 15 seconds or less or 10 seconds or less. Most preferably the formulation is added to the aqueous fluid 10 seconds or less (such as from 0.1 to 10 seconds, or from 0.5 to 5 seconds) before the aqueous fluid is injected into the hydrocarbon-containing system; for example it may be added 5 seconds or less, 4 seconds or less, 3 seconds or less, or 2 seconds or less before the aqueous fluid is injected into the hydrocarbon-containing system.

It is beneficial to add the formulation to the aqueous fluid at a time relatively close to its injection into the hydrocarbon-containing system. This is because when using low concentrations of the agent continuously, it is particularly advantageous that there is not an opportunity for the active agent to be negatively affected by any pre-treatments of the aqueous fluid, such as de-aeration.

The aqueous fluid that is injected into the system is suitably sea water, in particular de-aerated sea water.

The hydrocarbon-containing system may, in one embodiment, be a container for storing or processing hydrocarbons. It may, for example, be a hydrocarbon-containing system within an offshore platform, e.g. a storage container within an offshore oil or gas platform, or a hydrocarbon-containing system within an FSO vessel (floating storage and offloading vessel) or FPSO vessel (floating production, storage and offloading vessel), e.g. a storage container or slop tank within an FSO or FPSO vessel. Other containers for storing or processing oil or gas may also be contemplated.

The hydrocarbon-containing system may suitably be a petroleum reservoir; it may therefore be an oil reservoir or a gas reservoir. As the skilled person will understand, a petroleum reservoir is a pool of naturally occurring hydrocarbon material contained in porous or fractured rock formations. In such a reservoir, the naturally occurring hydrocarbon material, such as crude oil or natural gas, is trapped below the surface by overlying rock formations. Preferably the system is an oil reservoir.

In one embodiment, the system is an oil reservoir selected from: reservoirs with extensive micro-fractures, mature reservoirs with large thermal viability shells, low permeability reservoirs, reservoirs with souring within the matrix, and static or low flow reservoirs.

The invention may be used in relation to any bacteria (or other microbes) that can be found in petroleum reservoirs, including sulphate-reducing prokaryotes (SRP) (which may be sulphate-reducing bacteria and/or sulphate-reducing archaea), general heterotrophic bacteria (GHB), and nitrate-reducing bacteria (NRB). Methanogenic microbes can also be found in petroleum reservoirs and the invention may therefore also be used in relation to such species, including methanogenic archaea (e.g. *Methanosarcinales* species or *Methanothermococcus* species).

The bacteria or other microbes may be planktonic or may be sessile, for example the bacteria or other microbes may be in the form of a biofilm.

In one preferred embodiment the invention provides the use of the formulation comprising THP or THPX to disrupt the activity of sulphate-reducing prokaryotes; in particular the formulation may be used to reduce or prevent the generation of hydrogen sulphide by sulphate-reducing prokaryotes.

Therefore the invention provides a new route for the reduction or prevention of biological reservoir souring.

The invention also provides the use of the formulation comprising THP or THPX to disrupt the activity of methanogenic microbes; in particular the formulation may be used to reduce or prevent the generation of methane (and therefore reduce or prevent the consumption of hydrogen and $CO_2$) by methanogenic microbes, e.g. by methanogenic archaea.

Therefore the invention also provides a new route for the reduction or prevention of microbially-induced corrosion due to methanogenic microbes.

The invention also provides the use of the formulation comprising THP or THPX to disrupt the activity of methanogenic microbes that produce $H_2S$ in their metabolisms; in particular the formulation may be used to reduce or prevent the generation of hydrogen sulphide by methanogenic microbes, e.g. by methanogenic archaea.

Therefore the invention also provides a new route for the reduction or prevention of biological reservoir souring due to methanogenic microbes.

In another preferred embodiment the invention provides the use of the formulation comprising THP or THPX to disrupt the corrosive activity of microbes; in particular the formulation may be used to reduce or prevent the corrosion of metal surfaces, such as steel, by microbes.

In another preferred embodiment the invention provides the use of the formulation comprising THP or THPX to disrupt the corrosive activity of bacteria or other microbes present in the form of biofilms; in particular the formulation may be used to reduce or prevent the corrosion of metal surfaces, such as steel, beneath biofilms.

Therefore the invention provides a new route for the reduction or prevention of microbially-induced corrosion. In particular this may be microbially-induced corrosion of metal surfaces, such as steel.

Microbially-induced corrosion is pitting corrosion that generally occurs underneath biofilms. In conventional "shot" or "batch" treatment by biocides, metal surfaces such as carbon steel pipework will undergo slow general corrosion between treatments, whereas in the present invention, the reduction potential is reduced, lowering the corrosion overpotential and reducing the corrosion overall.

The formulation may suitably be provided as a liquid, such as a solution or suspension. In one embodiment, the formulation is provided as a solution of the THP or THPX in a suitable solvent, such as an aqueous solvent, e.g. water.

The formulation preferably comprises 10 wt % or more THP or THPX, such as from 15 wt % to 80 wt %, e.g. from 20 wt % to 70 wt % or from 30 wt % to 60 wt %.

The formulation may optionally further comprise other components, such as components known in the art for use in petroleum reservoirs. These may be active agents or may be carriers.

The formulation may, for example, further comprise a biopenetrant, such as a phosphonate endcapped biopenetrant.

Examples of suitable biopenetrants that may be used in combination with THP or THPX are those described in WO 99/33345 and WO2005/074688.

Preferred biopenetrants are phosphonate endcapped biopenetrants which comprise a polymer of an unsaturated carboxylic acid (e.g. acrylic acid) or a copolymer of an unsaturated carboxylic acid (e.g. acrylic acid) with a sulphonic acid, said polymer or copolymer being terminated by a mono- or diphosphonated unsaturated carboxylic acid group or having such monomers incorporated into the polymer backbone. In particular, these biopenetrants may comprise a polymer of an unsaturated carboxylic acid (e.g. acrylic acid) or a copolymer of an unsaturated carboxylic acid (e.g. acrylic acid) with a sulphonic acid, said polymer or copolymer being either terminated by vinylphosphonic acid (VPA) or vinylidene-1,1-diphosphonic acid (VDPA) or having such monomers incorporated into the polymer backbone.

In particular, the formulation may comprise i) THPX (e.g. THPS or THPC) and (ii) a biopenetrant, where the biopenetrant is a polyacrylate terminated with vinylphosphonic acid or with vinylidene-1,1-diphosphonic acid, or is a polyacrylate incorporating VPA and/or VDPA monomers, or is an acrylate/sulphonate copolymer (i.e. a copolymer of acrylic acid and unsaturated sulphonic acid monomers) terminated with vinylidene-1,1-diphosphonic acid or with vinylphosphonic acid, or is an acrylate/sulphonate copolymer incorporating VPA and/or VDPA monomers.

The formulation preferably comprises from 0.05 to 25 wt % of biopenetrant, such as from 0.1 wt % to 20 wt %, e.g. from 0.5 wt % to 15 wt % or from 1 wt % to 10 wt %.

It may, for example, be that the formulation comprises from 20 to 70 wt % THPX (e.g. THPS or THPC) and from 1 to 10 wt % phosphonate endcapped biopenetrant.

The formulation may optionally also comprise other control agents for bacteria or other microbes. For example, these may be control agents selected from nitrates, nitrites and anthraquinone.

The formulation may, optionally, comprise a corrosion inhibitor. The corrosion inhibitor may be any corrosion inhibitor suitable for use in hydrocarbon-containing systems, such as oil and gas reservoirs.

Examples of suitable corrosion inhibitors that may be used in combination with THP or THPX are those described in WO 2005/040050. In addition, "A Review on Recent Patents in Corrosion Inhibitors", *Recent Patents on Corrosion Science*, 2010, 2, 6-12 also discloses examples of corrosion inhibitors. The skilled person will be aware of corrosion inhibitors that could suitably be included.

The corrosion inhibitor may, in one embodiment, be selected from alcohols that are primary, secondary or tertiary alcohols having an acetylenic bond in the carbon backbone.

In one embodiment the corrosion inhibitor is selected from octyl phosphonic acid (OPA) and thioglycolic acid.

The formulation preferably comprises from 0.01 to 25 wt % of corrosion inhibitor, or from 0.05 to 25 wt % of corrosion inhibitor, such as from 0.05 wt % to 20 wt %, e.g. from 0.1 wt % to 15 wt % or from 0.5 to 12 wt % or from 1 wt % to 10 wt %.

Although the THP or THPX active agent may be added to the system together with other active agents (and the THP or THPX active agent and these agents may in one embodiment be provided together in a single formulation), the treatment of the present invention may—alternatively or additionally—involve adding other active agents (such as biopenetrants, or other control agents for bacteria, or corrosion inhibitors) to the system separately from the THP or THPX active agent. Thus one or more other active agent may be added to the system separately from the THP or THPX active agent.

Thus in one embodiment the treatment of the present invention may alternatively or additionally involve adding other active agents such as biopenetrants, or other control agents for bacteria, to the system separately from the THP or THPX active agent.

The invention includes a step of monitoring the efficacy of the continuous treatment by an assessment of the extent to which there is any effect on the environment that is attributable to metabolic activity of active bacteria or other microbes present in the system.

In the technique of the present invention the metabolic activity of the microbes (e.g. bacteria) is inhibited, rather than the bacteria or other microbes being killed. Therefore the monitoring step involves looking for effects on the environment that are directly attributable to active bacteria or other active microbes in the system, with a successful treatment regime being indicated by a reduction or prevention of these effects.

Conventional monitoring techniques used for "shot" dosing are not appropriate for use in the present invention, as these assess the efficacy of a biocide in killing the microorganisms. This would be by determining the number of live bacteria or other microbes in a sample. If a sample was taken when using the technique of the present invention, this sample would contain inactive but live bacteria or other microbes; therefore a sample removed from the system and tested as in a conventional manner would suggest that the technique was not successfully working.

In one embodiment, the monitoring step is by an assessment of the extent to which there is any activity for the bacteria or other microbes, by monitoring for the presence of a chemical product in the system that indicates microbial metabolic activity (e.g. bacterial metabolic activity).

Preferably the monitoring step involves monitoring a waste product associated with bacterial activity or other microbial activity (e.g. hydrogen sulphide) or another by-product associated with bacterial activity or other microbial activity (e.g. an enzyme). A lack of increase in a waste product or other by-product associated with bacterial or other microbial activity would indicate the metabolic activity of the microbes (e.g. bacteria) is successfully being inhibited. It may be that the monitoring step involves monitoring a waste product associated with bacterial activity (e.g. hydrogen sulphide) or another by-product associated with bacterial activity (e.g. an enzyme).

It may be that the waste product or other by-product associated with microbial metabolic activity is selected from methane, hydrogen sulphide, lactate dehydrogenase enzyme and sulphate reductase enzyme.

In one embodiment the monitoring step involves monitoring a waste product or other by-product associated with microbial metabolic activity (e.g. bacterial metabolic activity), where the product is selected from hydrogen sulphide, lactate dehydrogenase enzyme and sulphate reductase enzyme.

In another embodiment, the monitoring step is by an assessment of the extent to which there is any activity for the bacteria or other microbes, by monitoring an environmental change that indicates microbial activity (e.g. bacterial activity).

The environmental change that is monitored may, in one embodiment, be selected from changes in the extent of biomass build up or changes in the extent of microbially-induced corrosion.

For example, the monitoring step may monitor changes in the extent of biomass build up or changes in the extent of microbially-influenced corrosion. A lack of an increase in biomass build up or a lack of an increase in microbially-influenced corrosion would indicate the metabolic activity of the bacteria or other microbes is successfully being inhibited.

It may be that the monitoring step involves an assessment of the extent to which there is any effect on the environment that is attributable to metabolic activity of active sulphate-reducing prokaryotes (e.g. sulphate-reducing bacteria or sulphate-reducing archaea) present in the system.

It may, alternatively or additionally, be that the monitoring step involves an assessment of the extent to which there is any effect on the environment that is attributable to metabolic activity of active methanogenic microbes (e.g. methanogenic archaea) present in the system.

It may be that the monitoring step involves monitoring the levels of a product in the environment that is used during microbial activity. A lack of decrease in such a product that is used during microbial activity would indicate the metabolic activity of the microbes is successfully being inhibited. For example, hydrogen and $CO_2$ are used during generation of methane by active methanogenic microbes.

The monitoring step may, in one embodiment, include one or more of the following:

a. Measurement of $H_2S$. This may, for example, be by using a technique selected from: electro-chemical and colorimetric techniques. A second, cross-checking, test may optionally be used; this may also be by a technique selected from electro-chemical and colorimetric techniques.

b. Measurement of the presence of an enzyme associated with bacterial metabolic activity (or other microbial metabolic activity). This may be using a technique selected from: testing for the presence of lactate dehydrogenase enzyme and testing for the presence of sulphate reducatase enzyme.

c. Measurement of the extent of biomass build-up. This may be using biocoupons.

d. Measurement of the presence of microbially-influenced corrosion. This may be using biocoupons.

Other monitoring steps that may be contemplated, as alternative monitoring steps to the above, or as additional monitoring steps to one or more of the above, include:

e. Measurement of methane. This may, for example, be by using gas chromatography.

f. Measurement of $CO_2$. This may, for example, be by using gas chromatography. However, in the event that background levels of $CO_2$ are high, the decrease in levels caused by metabolic activity of microbes may be difficult to accurately detect. Therefore this may be a less preferred option.

g. Measurement of hydrogen. This may, for example, be by using gas chromatography. However, in the event that background levels of hydrogen are high, the decrease in levels caused by metabolic activity of microbes may be difficult to accurately detect. Therefore this may be a less preferred option.

Where required, the invention may include an optimisation of the treatment programme following the monitoring step. The optimisation is to ensure that the treatment is having an effect on the metabolic activity of active bacteria present in the system.

The optimisation step will take into account the information obtained from the monitoring step and will make one or more change to the continuous treatment regime.

This optimisation may include one or more of the following changes:

a. Varying the THP or THPX dose level. This may be lowered to encourage disruption of the energy cycle or uncoupling effects, or may be increased to disrupt/inhibit enzyme production and/or destroy produced enzymes.

b. Varying the ratio of THP or THPX to other components in the formulation, e.g. increasing the amount of biopenetrant.

c. Adding a treatment step involving "shot-dosing" of biocide to the treatment. The biocide may be THP or THPX or may be another type of biocide. The biocide may be added for a period of from 1 to 6 hours in duration at concentrations in the range of from 50 to 500 ppm.

d. Adding control agents for bacteria to the formulation or adding a treatment step involving separate dosing of control agents for bacteria. The control agents may be selected from nitrates, nitrites and anthraquinone.

The invention may optionally include a step of monitoring the amounts of THP or THPX present. This may suitably be monitored by an assessment of the levels of THP or THPX leaving the system. In particular, the aqueous fluid that was injected into the system will leave the system (as "produced water") containing THP or THPX active agent. This aqueous fluid can therefore be tested to determine the content of THP or THPX active agent.

In conventional "shot" biocidal treatments, the amounts of THP or THPX in the aqueous fluid leaving the system would vary considerably over time, depending on whether a "shot" had recently been applied. Thus the THP or THPX active agent would be present in the "produced water" only at intermittent time intervals.

In contrast, the use of continuous treatment in the present invention allows samples of the "produced water" to be taken at any time, once the dosing regime is established, and the amount of THP or THPX can be reliably quantified from these samples.

In one embodiment, the invention includes a step of measuring the amount of THP or THPX active agent that is present in the aqueous fluid that leaves the system. A single measurement may be taken, or more than one measurement may be taken. As is well known in the art, taking multiple measurements and then determining an average (mean) value and the standard deviation may be beneficial in order to improve accuracy.

The measurement (or each measurement) may be taken directly by carrying out suitable tests on the aqueous fluid. Alternatively, one or more samples of the aqueous fluid may be taken and then subsequently tested to obtain the measurement(s).

It may be that the measurements are taken as the aqueous fluid leaves the system, or immediately after the aqueous fluid leaves the system. Alternatively, it may be that there is a time delay between the aqueous fluid leaving the system and the measurements being taken, for example a delay of 5 minutes or more (e.g. from 5 minutes to 4 hours), or 15 minutes or more, such as 30 minutes or more, or an hour or more.

Any suitable methods may used to determine the amount of THP or THPX active agent that is present in the aqueous fluid. The skilled person will be aware of techniques for measuring amounts of THP or THPX.

These include techniques such as iodine titration or phosphorus measurements using (i) inductively coupled plasma (ICP), (ii) high performance ion chromatography, (iii) optical emission spectroscopy or (iv) oxidation of the organically bound phosphorus to inorganic phosphate and colorimetric measurement of the increased phosphate concentration (e.g. using the "Hach method" in which organic phosphorus is oxidized to phosphate by UV/persulfate, and the increased phosphate concentration is measured as the phosphomolybdate blue complex). Other known techniques for measuring phosphorus levels may also be contemplated.

In the event that other phosphorus-containing chemicals are present in the system, such as a phosphorus-containing scale inhibitor, then it is preferred that any such phosphorus-containing chemicals are removed from the aqueous fluid, or sample thereof, so that the measured amounts are attributable only to the THP or THPX, rather than also to these other phosphorus-containing chemicals. This then allows the amount of phosphorus due to the THP or THPX and the amount of phosphorus due to other phosphorus-containing chemicals, such as scale inhibitors, to be separately quantified. This may, for example, be measured by using ICP or by the "Hach method", or by any other suitable analytical technique.

Examples of phosphorus-containing scale inhibitors are phosphonates, such as Briquest® 543 and 5123, phosphonomethylated polyamines, polyphosphinocarboxylic acid, and phosphorus-containing polymers. Such phosphorus-containing scale inhibitors are commonly used in hydrocarbon-containing systems, such as oil and gas reservoirs.

Scale inhibitors, when present in hydrocarbon-containing systems, are usually present in amounts of about 250 mg/l or less, such as 200 mg/l or less, and in particular 150 mg/l or less, or 100 mg/l or less. They may be present in an amount of from 1 mg/l to 250 mg/l, e.g. from 5 mg/l to 100 mg/l.

It may be that any other phosphorus-containing chemicals are removed from the aqueous fluid, or sample thereof, before it is tested. Then the tested fluid contains only the THP or THPX as phosphorus-containing chemicals, and the test will be able to directly measure the amount of THP or THPX present.

It may, alternatively, be that an initial test is carried out on the aqueous fluid, or sample thereof, which will measure the total amount of phosphorus-containing chemicals present. Then the other phosphorus-containing chemicals are removed from the aqueous fluid, or sample thereof, before it is re-tested. The re-tested fluid contains only the THP or THPX as phosphorus-containing chemicals, and the re-test will be able to directly measure the amount of THP or THPX present. Further, a comparison of the results from the initial test and the re-test will allow the amount of other phosphorus-containing chemicals (e.g. phosphorus-containing scale inhibitors) to be determined.

In one embodiment, calcium carbonate is used to remove other phosphorus-containing chemicals (e.g. phosphorus-containing scale inhibitor) from the aqueous fluid, or sample thereof, before it is tested. The calcium carbonate acts as a universal solid adsorbent to adsorb the phosphorus-containing scale inhibitor or other phosphorus-containing chemicals from the aqueous fluid, leaving the THP or THPX in the aqueous fluid.

It may be that the amount of phosphorus-containing chemicals adsorbed onto the calcium carbonate is subsequently measured. This may be achieved by washing the calcium carbonate with water and drying it, before then dissolving the calcium carbonate in concentrated acid and carrying out an analysis of the phosphorus content. This may be achieved by one of the techniques for measuring phosphorus levels discussed above.

In one embodiment, the invention includes a step of measuring the amount of THP or THPX active agent that is present in the aqueous fluid that leaves the system, by using one of the following:

(a) Quantification of active THP or THPX using an iodine titration, at neutral or weakly basic pH, e.g. at pH 7-8. For example, this may use 0.1 N iodine in weakly basic materials such as pyridine, aqueous $NaHCO_3$ or aqueous $Na_2HPO_4$.

(b) Quantification of active THP or THPX using inductively coupled plasma (ICP) mass spectrometry or optical emission spectroscopy.

(c) Quantification of active THP or THPX using oxidation of the organically bound phosphorus to inorganic phosphate and colorimetric measurement of the increased phosphate concentration (e.g. using the "Hach method").

Options (b) and (c) may be used directly if the only phosphorus-containing chemicals in the aqueous fluid are THP and/or THPX. However, if other phosphorus-containing chemicals are in use, such as a phosphorus-containing scale inhibitor, then calcium carbonate or another solid adsorbent should be used to remove the other phosphorus-containing chemicals before then carrying out the THP/THPX quantification technique. Optionally, a phosphorus quantification technique may also be carried out before using the calcium carbonate to remove the other phosphorus-containing chemicals, thus allowing the amount of the other phosphorus-containing chemicals to be determined, by comparing the results of the two quantification techniques.

In one embodiment, the invention may also include one or more pre-treatment steps to facilitate the continuous treatment programme.

For example, there may be a pre-treatment step that comprises addition of a biocide to prepare the system for the continuous treatment programme, by removal of existing iron sulphide deposits and/or by weakening existing biomass to increase susceptibility of the biomass to the continuous treatment.

This pre-treatment step may involve a conventional "shot dosing" treatment. For example, a biocide may be added for a period of from 1 to 6 hours in duration at concentrations in the range of from 50 to 500 ppm. The biocide may be THP or THPX or may be another type of biocide.

In one embodiment, the invention may also include an initial step of surveying the system to confirm the suitability of a continuous dosing approach.

This initial step of surveying the system may include one or more of the following:

a. Use of sulphur isotope ratio analysis (SIRA) to establish the existence of biological reservoir souring.

b. Assessment of the system's geology and characteristics to ensure suitability of the continuous biocide treatment. This may include coreflood or core damage assessment tests, and/or assessment of the interaction of injector-producer pairs.

c. Use of reservoir souring modelling and prediction calculations and/or software.

In one embodiment, the invention may also include an initial step of designing the continuous dosing regime.

This design step may include one or more of the following:

a. Efficacy testing of THP or THPX formulations against indigenous bacteria isolated from the hydrocarbon-containing system or from produced waters from the system.

b. Laboratory based efficacy studies using pressurised bioreactors to simulate the hydrocarbon-containing system. This may involve identification of the optimum continuous dose of the formulation.

In one embodiment, the invention may also include one or more post-treatment steps to deactivate or dilute THP or THPX active agent leaving the system. In particular, the aqueous fluid that was injected into the system will be expected to leave the system (as "produced water") containing some THP or THPX active agent. There may be a desire to reduce the levels of THP or THPX in active form in this aqueous fluid that leaves the system.

In particular, although these THP/THPX active agents degrade naturally in the environment, there may be instances where deliberate deactivation is advantageous. This may be useful in a variety of scenarios, but particularly in the event that the "produced water" enters environmentally sensitive waters. There may be local regulations to be met in respect of certain areas of water in certain jurisdictions, or there may simply be a desire to avoid having active agents entering the local water system.

The post-treatment step may involve any suitable treatment that will act to deactivate or dilute THP or THPX active agent. The skilled person will be aware of suitable options as these active agents are known in the art. However, specific examples of treatments that may be mentioned include dilution in aerated water, treatment with activated carbon, or oxidation with a suitable oxidising agent (e.g. hydrogen peroxide, sodium hypochlorite or sodium thiosulphate).

The post-treatment step may be such that there is substantially zero THP or THPX in active form in the aqueous fluid that leaves the system. Alternatively, the amounts of THP or THPX in active form may be reduced to an acceptable level. It may be that the amounts of THP or THPX in active form are reduced by 10% v/v or more, such as 20% v/v or more, or 30% v/v or more, or 40% v/v or more, or 50% v/v or more, or 60% v/v or more, or 70% v/v or more, or 80% v/v or more, or 90% v/v or more. In one embodiment, the amounts of THP or THPX in active form are reduced by from 10 to 100% v/v, such as from 20 to 95% v/v.

It may be that post-treatment step is carried out immediately before the aqueous fluid leaves the system, or as the aqueous fluid leaves the system, or immediately after the aqueous fluid leaves the system. Alternatively, it may be that there is a time delay between the aqueous fluid leaving the system and the post-treatment step being carried out, for example there may be a delay of 5 minutes or more (e.g. from 5 minutes to 4 hours), or 15 minutes or more, such as 30 minutes or more, or an hour or more.

The invention will now be further described, in a non-limiting manner, with reference to the following Examples.

EXAMPLES 1.1 Bioreactor Construction

The bioreactor used was constructed from titanium; this construction eliminated the risk of any production of iron sulphides through corrosion, which in turn would react with injected THPS. The column was 75 cm in length, and had an internal diameter of 5.22 cm. The column was packed with low-iron sand (Fisher, UK) with a glass fibre plug at the base to prevent the draining of sand during filling. The column fittings (injection and production pipework) were constructed from 316 stainless steel (Swagelok).

A schematic diagram of the bioreactor is given in FIG. 1.

1.2 Operation (Injection Fluids, Cycle)

The column was maintained at 1000 psig (70 barg) and 24° C.±1° C. The pressure was held between the pump head and the proportional release valve. The use of 1-way valves in the injection head permitted disconnection and maintenance of the pump without depressurisation of the column.

The pump used was a high-pressure liquid chromatography pump (PerkinElmer Series 100). The pump was operated in a continuous fashion at an injection rate of 1 mL/min, injecting into the head of the bioreactor.

Injection fluid was prepared daily on workdays, with three days of fluid prepared on Friday to cover the weekend. During the week, a single pump was used on a continuous basis. Over the weekend, three pumps were used, cycling in three hour injection windows. The injection fluid was stored in a polyethylene terephthalate (PET) nitrogen-pressurised vessel at 2° C.±1° C.

The North Sea seawater used throughout the study was collected from Bridlington, Yorkshire on a quarterly basis. It was de-oxygenated through nitrogen sparging over a 48 hour period. Metabolisable carbon was added to the seawater in the form of volatile fatty acids (VFA) in the ratio of 100 acetate:10 propionate:1 butyrate by weight. Acetate and propionate were added as salt in order to avoid acidification of the injection fluid, whilst butyrate was added as the acid. The pH of the injection fluid was between 7.5 and 8 before the addition of THPS. The VFA totalled 111 mg/L, which, if converted entirely to sulphide (i.e. none used for biomass growth), should permit the production of 67 mg/L $H_2S$.

1.3 Inoculation

The bioreactor was inoculated using a mixed consortia of prokaryotes obtained from North Sea seawater and North Sea oil reservoirs. Rawwater Engineering Company Limited (RECL) maintained a mixed consortia of sulphate-reducing prokaryotes (SRP) in bioreactors under the experimental conditions required for the project (24° C., 1000 psig). These bioreactors were used solely for inoculation purposes. Both bioreactors increased the chances of successfully inoculating new bioreactors, by limiting the changes in environmental conditions the microbes were subjected to and thus limiting stress. The column was inoculated with microbes, shut-in for a fortnight and operated under batch flow conditions (140 mL fluid per day in equally spaced thirty-minute injection windows) until SRP were known to be established through the production of hydrogen sulphide.

1.4 Analyses

Effluent samples were collected on a daily basis onto zinc acetate. This reacted with the volatile hydrogen sulphide to form stable zinc sulphide precipitate, which permitted analysis at a later time. All samples were analysed within six hours of collection. The samples were analysed through the standard methylene blue colourimetric procedure, which was calibrated monthly against the iodometric sulphide method.

Zinc was added in excess in order to minimise loss of hydrogen sulphide, and tests with and without zinc, i.e. collecting low concentrations of hydrogen sulphide directly onto the first analysis chemical, did not result in a significant discrepancy.

1.5 Details of Trials

Three trials were conducted:

Trial 1—Starting with a dose of 30 mg/L THPS, the dose concentration of THPS was reduced in 10 mg/L steps until sulphide recovery was observed. This trial also indicated the minimum THPS required to keep an SRP population in biostasis and indicated the medium-term biocidal effects of low-dosed THPS.

Trial 2—A repeat of Trial 1.

Trial 3—Taking the reverse approach to Trials 1 and 2, a sour column was treated with a low concentration of THPS (5 mg/L), which was increased until the SRP activity was suppressed. This indicated the minimum starting concentration of THPS required to convert the SRP from normal activity to biostasis.

2. RESULTS AND DISCUSSION 2.1 Trial 1

Figure 2:
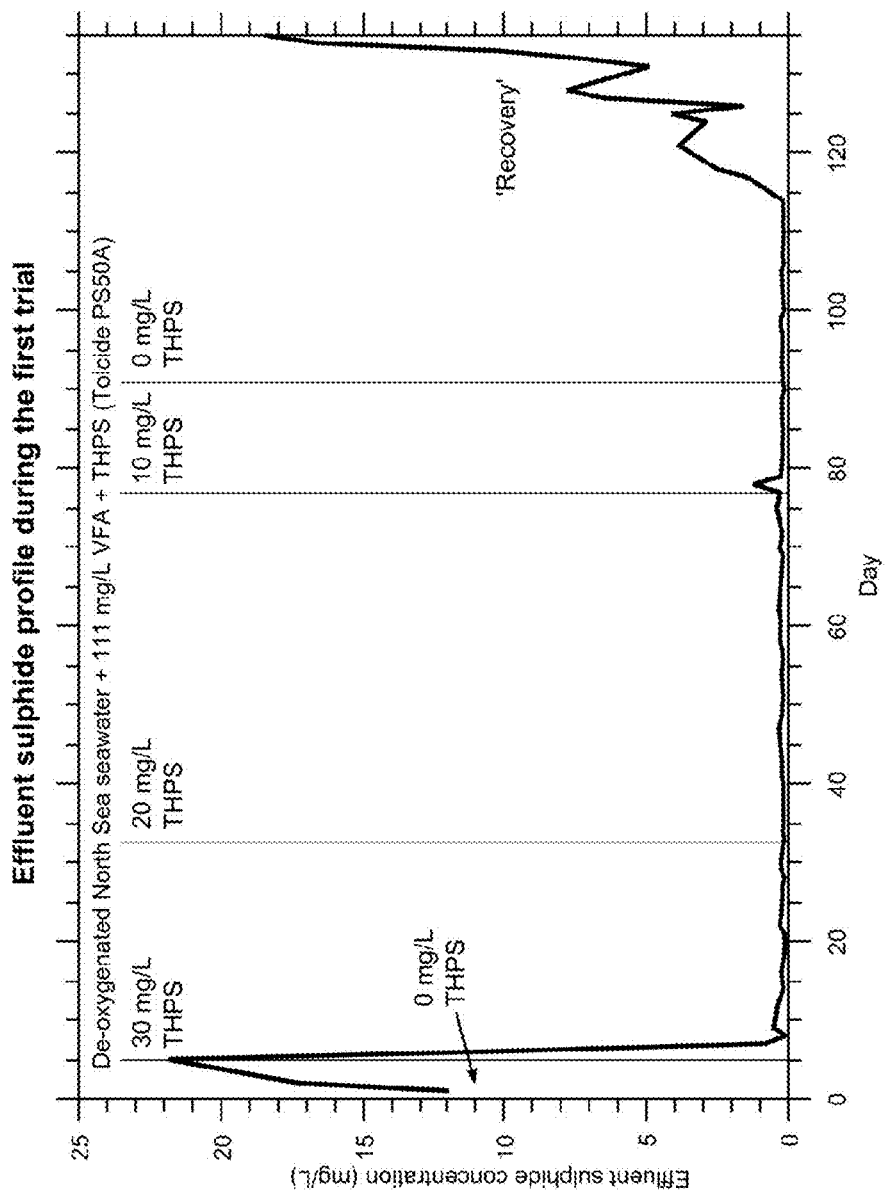
FIG. 2 represents the results from the first trial (trial 1) showing the effluent sulphide profile during the first trial.

The results from Trial 1 are presented in FIG. 2.

The pre-soured bioreactor was producing a considerable sulphide concentration before the THPS formulation (Tolcide PS50A, inclusive of penetrant) was introduced to the injection fluid vessel. The active concentration of THPS was 30 mg/L (60 mg/L product, which was provided at a 50 wt % concentration).

The presence of THPS immediately caused a collapse in biological activity and sulphide production to sub-mg/L concentrations. This concentration of THPS was injected for a period of 28 days, during which the sulphide concentration was not observed to recover in any way. It was concluded that 30 mg/L THPS was sufficient to force the established microbes into stasis—only trace concentrations of hydrogen sulphide were observed—and that any biofilm shielding effect was absent due to the continuous nature of the biocide dosing.

The THPS dose was reduced to 20 mg/L active product on day 33. Over the 44 day period, no recovery in sulphide was observed.

The biocide dosing concentration was reduced still further, to 10 mg/L. Over this shorter period (14 days), no significant increase in sulphide was recorded and it was decided to remove THPS from the column entirely. The biocide was injected into the column for a total of 86 days.

The bioreactor continued to produce low concentrations of hydrogen sulphide for a period of 25-27 days (no analyses were recorded during the weekend), before a gradual rise was recorded. Sulphide was subsequently observed and a rapid rise recorded (denoted 'recovery' in the Figure), which could be due to a combination of three factors:

Inoculation of new SRP from the North Sea seawater.
Recovery of SRP that had survived the THPS dosing (emergence from the "biostat" phase).
Multiplication of the microbes established in the column.

2.2 Trial 2

Figure 3:
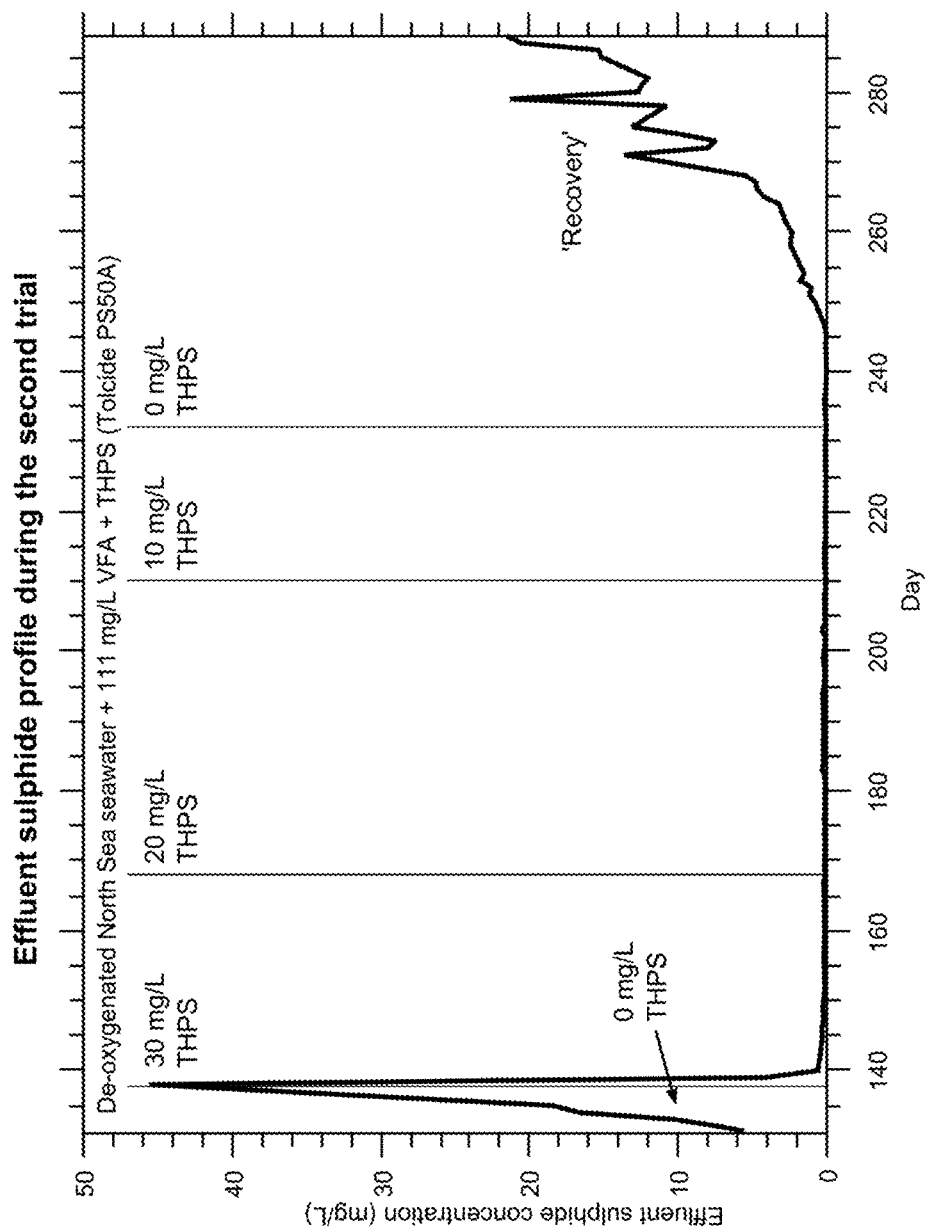
FIG. 3 represents the results from the second trial (trial 2) showing the effluent sulphide profile during the second trial.

The results from the second trial are presented in FIG. 3.

As with Trial 1, the introduction of 30 mg/L THPS plus penetrant resulted in the immediate collapse of biological activity and effluent sulphide, which remained suppressed under conditions including 20 and 10 mg/L THPS. Biocide was injected for a total of 91 days.

2.3 Trial 3

Figure 4:
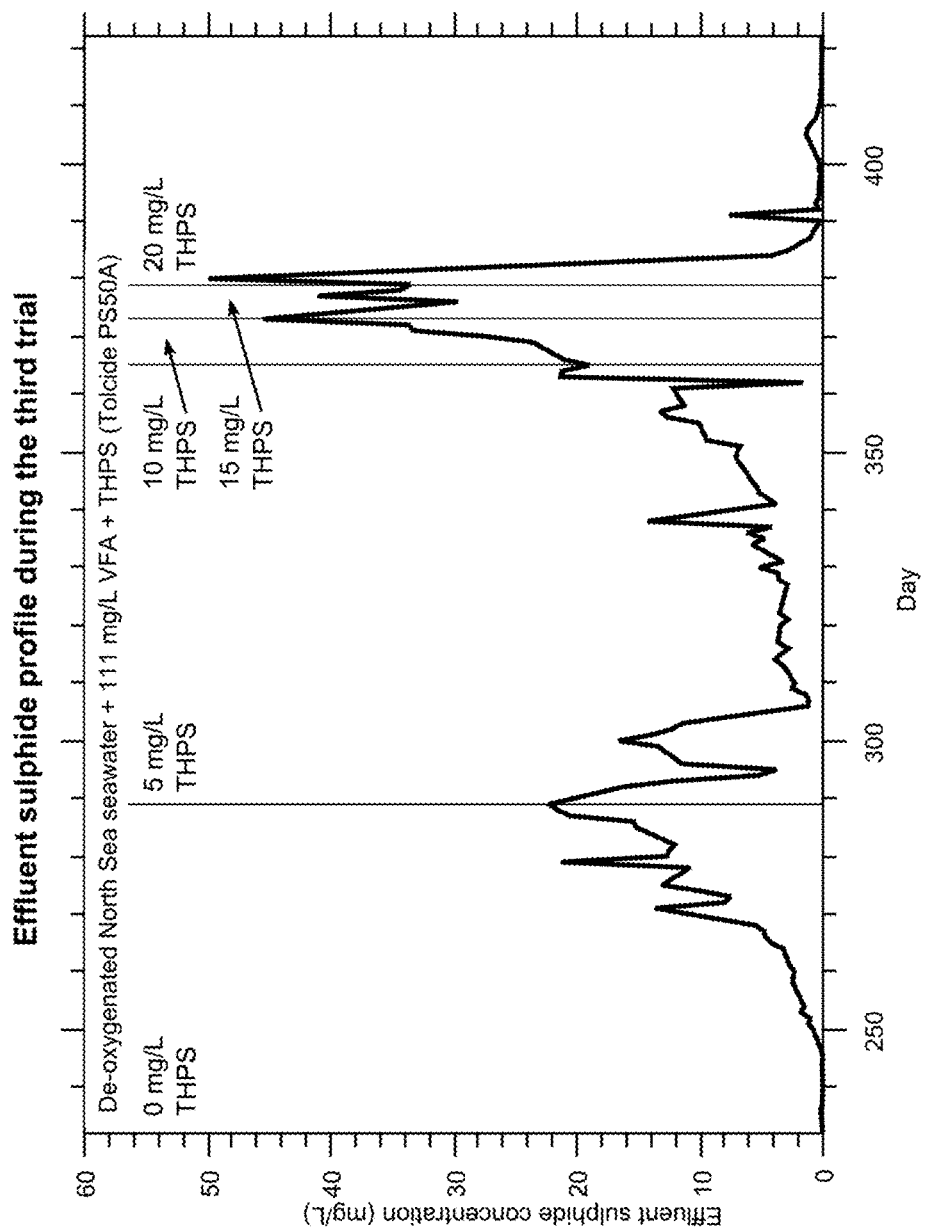
FIG. 4 represents the results from the third trial (trial 3) showing the effluent sulphide profile during the third trial.

The results from the third trial are presented in FIG. 4.

This trial was run with a reverse dosing regime to the first two trials: the initial THPS dose would be low, and increased until control over the column biomass was established.

The initial exponential rise was the recovery/establishment of biomass in the column following the second dosing trial. The inclusion of 5 mg/L THPS plus penetrant in the injection fluid rapidly halted the growth of the SRP population although it proved insufficient to keep the entire column under biostasis. A slow inhibited increase in effluent sulphide was observed whereupon it was decided to increase the THPS dosing to 10 mg/L. A further increase to 15 mg/L appeared to stabilise the effluent sulphide. After one further week, the THPS dose was increased to 20 mg/L, whereupon the effluent sulphide collapsed and remained low for the duration of the experiment.

It is believed that the initial 5 mg/L THPS insufficiently stressed all the microbes, permitting a small number of bacteria that were still functioning to develop biofilm protection and thereby increasing their resistance to the biocide. However, the dosing of 20 mg/L was clearly able to overwhelm all the microbes and de-sour the system.

Nevertheless, a very low dosing concentration of only 5 mg/L THPS was able to break a biomass growth trend and result in significantly retarded growth thereafter.

An optimised dosing procedure might include an initial phase of elevated THPS in order to comprehensively suppress all SRP. This suppressed condition could then be maintained by a lower THPS dose concentration.

3. CONCLUSIONS

The continuous dosing of low levels of THPS has been shown to be an effective method to suppress an unwanted effect of microbial activity (in this case, biological hydrogen sulphide production) in a highly fouled system.

The invention claimed is:

1. A method for reducing the effects of biological contamination in a hydrocarbon-containing system into which aqueous fluid is injected, the method comprising the steps of:
    continuously adding a formulation comprising tris(hydroxymethyl) phosphine or a tetrakis (hydroxymethyl) phosphonium salt to the system for a time period of one day or more;
    monitoring the efficacy of the continuous treatment by an assessment of the extent to which there is any effect on the environment that is attributable to metabolic activity of active microbes present in the system;
    wherein the tris(hydroxymethyl) phosphine or tetrakis (hydroxymethyl) phosphonium salt is added at a concentration of from 1 to 30 ppm, based on the total volume of aqueous fluid added to the system,
    and wherein the formulation is added to the system at a stage to minimize incompatibility with other any other chemicals that are added to the aqueous fluid, wherein calcium carbonate is used to remove phosphorus-containing chemicals which are not tris(hydroxymethyl) phosphine or a tetrakis (hydroxymethyl) phosphonium salt from the aqueous fluid, in order to allow the quantification of the tris(hydroxymethyl) phosphine or a tetrakis (hydroxymethyl) phosphonium salt in the aqueous fluid.

2. The method of claim 1, wherein the method further comprises the step of
operating the continuous treatment to ensure that the treatment is having an effect on the metabolic activity of active microbes present in the system.

3. The method of claim 2, wherein the active microbes are selected from the group consisting of bacteria and archaea.

4. The method of claim 2, wherein the active microbes are selected from the group consisting of sulphate-reducing prokaryotes, general heterotrophic bacteria, and nitrate-reducing bacteria.

5. The method of claim 2, wherein the active microbes are selected from the group consisting of sulphate-reducing bacteria, sulphate-reducing archaea and methanogenic archaea.

6. The method of claim 1, wherein the formulation includes a tetrakis (hydroxymethyl) phosphonium salt wherein the salt is based on an anion selected from the group consisting of chloride, sulphate, bromide, iodide, phosphate, acetate, oxalate, citrate, borate, chlorate, lactate, nitrate, fluoride, carbonate and formate.

7. The method of claim 6, wherein the formulation includes a tetrakis (hydroxymethyl) phosphonium salt selected from the group consisting of tetrakis (hydroxymethyl) phosphonium sulphate, tetrakis (hydroxymethyl) phosphonium chloride and tetrakis (hydroxymethyl) phosphonium phosphate.

8. The method of claim 1, wherein the formulation is added to the system continuously for a time period of 7 days or more.

9. The method of claim 1, wherein the tetrakis(hydroxymethyl) phosphine or tetrakis (hydroxymethyl) phosphonium salt is added at a concentration of from 5 to 25 ppm based on the total volume of aqueous fluid added to the system.

10. The method of claim 9, wherein the tetrakis(hydroxymethyl) phosphine or tetrakis (hydroxymethyl) phosphonium salt is added at a concentration of from 10 to 20 ppm based on the total volume of aqueous fluid added to the system.

11. The method of claim 1, wherein the formulation is added to the aqueous fluid at a time that is 10 seconds or less before the aqueous fluid is injected into the hydrocarbon-containing system.

12. The method of claim 1, wherein the hydrocarbon-containing system is selected from the group consisting of oil reservoirs, gas reservoirs, and containers for storing or processing oil or gas.

13. The method of claim 12, wherein the system is an oil reservoir selected from reservoirs with extensive microfractures, mature reservoirs with large thermal viability shells, low permeability reservoirs, reservoirs with souring within the matrix, and static or low flow reservoirs.

14. The method of claim 1, wherein the formulation further comprises a biopenetrant, a corrosion inhibitor, or combinations thereof.

15. The method of claim 14, wherein formulation comprises a biopenetrant and the biopenetrant is selected from the group consisting of phosphonate endcapped biopenetrants which comprise a polymer of an unsaturated carboxylic acid or a copolymer of an unsaturated carboxylic acid with a sulphonic acid, said polymer or copolymer being terminated by a mono- or diphosphonated unsaturated carboxylic acid group or having such monomers incorporated into the polymer backbone.

16. The method of claim 14, wherein the formulation comprises from 0.05 to 25 wt % of biopenetrant.

17. The method of claim 1, wherein the formulation comprises from 0.05 to 25 wt % of corrosion inhibitor.

18. The method of claim 1, wherein the monitoring step involves an assessment of the extent to which there is any effect on the environment that is attributable to metabolic activity of active sulphate-reducing prokaryotes or active methanogenic microbes present in the system.

19. The method of claim 1, wherein the method further comprises one or more post-treatment steps to deactivate or dilute tris(hydroxymethyl) phosphine or tetrakis (hydroxymethyl) phosphonium salt active agent leaving the system.

20. The method of claim 1, wherein the formulation has an effect selected from the group consisting of:
disrupting the microbial activity of the active microbes;
disrupting the metabolic activity of sulphate-reducing prokaryotes;
disrupting corrosive activity of microbes present in the form of biofilm; and
preventing or reducing detrimental effects from the presence of active microbes.

21. The method of claim 20, wherein the formulation has an effect of preventing or reducing detrimental effects from the presence of active microbes, wherein the detrimental effects are selected from the group consisting of the generation of hydrogen sulphide, the generation of methane, and microbially-induced corrosion.

22. The method of claim 20, wherein the formulation has an effect of preventing or reducing detrimental effects from the presence of active microbes, wherein the detrimental effects are selected from the group consisting of the generation of hydrogen sulphide by sulphate-reducing prokaryotes, and microbially-induced corrosion of metal surfaces.

23. The method of claim 1, wherein the tris(hydroxymethyl) phosphine or tetrakis (hydroxymethyl) phosphonium salt is continuously added at a concentration of from 1 to 30 ppm, based on the total volume of aqueous fluid added to the system.

24. The method of claim 1, wherein the formulation is added to the aqueous fluid 20 seconds or less before the aqueous fluid is injected into the hydrocarbon-containing system.

25. The method of claim 1, wherein the formulation is added to the aqueous fluid 5 seconds or less before the aqueous fluid is injected into the hydrocarbon-containing system.

26. The method of claim 11, wherein the formulation is added to the aqueous fluid at a time that is 0.1 to 10 seconds before the aqueous fluid is injected into the hydrocarbon-containing system.

* * * * *